United States Patent
Segal et al.

(10) Patent No.: US 11,405,324 B1
(45) Date of Patent: Aug. 2, 2022

(54) PACKET SERIAL NUMBER VALIDATION

(71) Applicant: Amazon Technologies, Inc., Seattle, WA (US)

(72) Inventors: Avigdor Segal, Netanya (IL); Leah Shalev, Zikhron Ya'Aqov (IL); Nofar Mann, Modi'in (IL); Erez Izenberg, Tel Aviv-Jaffa (IL); Noam Katz, Tel Aviv-Jaffa (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/712,482

(22) Filed: Dec. 12, 2019

(51) Int. Cl.
*H04L 47/34* (2022.01)
*H04L 1/18* (2006.01)
*H04L 1/16* (2006.01)
*H04L 47/2483* (2022.01)

(52) U.S. Cl.
CPC ............ *H04L 47/34* (2013.01); *H04L 1/1614* (2013.01); *H04L 1/1832* (2013.01); *H04L 47/2483* (2013.01)

(58) Field of Classification Search
CPC ..... H04L 47/34; H04L 1/1614; H04L 1/1832; H04L 47/2483
See application file for complete search history.

(56) References Cited

U.S. PATENT DOCUMENTS

| | | | |
|---|---|---|---|
| 2004/0190516 A1* | 9/2004 | Williams | H04L 49/9063 370/392 |
| 2007/0014245 A1* | 1/2007 | Aloni | H04L 47/193 370/252 |
| 2012/0174216 A1* | 7/2012 | Vukovic | H04L 63/1466 726/22 |
| 2016/0277358 A1* | 9/2016 | Ambati | H04L 63/0272 |
| 2021/0167896 A1* | 6/2021 | Martin | H04L 1/187 |

* cited by examiner

*Primary Examiner* — Mandish K Randhawa
(74) *Attorney, Agent, or Firm* — Weaver Austin Villeneuve & Sampson LLP

(57) ABSTRACT

A technique for packet processing may include maintaining a data structure representing transport status information associated with a sliding window of sequential packets for a host system. When a packet targeted for the host system is received, a packet validation process can be performed on the packet. The packet validation process may include validating that the packet belongs to the sliding window of the sequential packets by comparing the packet serial number of the packet against the packets being expected in the sliding window. The packet validation process may also include validating that the packet is being received for the first time and is not a duplicate packet. Upon validating the packet, the packet can be placed into the host system, and the status information can be updated to indicate that the packet has been received.

21 Claims, 8 Drawing Sheets

PACKET SERIAL NUMBER VALIDATION

BACKGROUND

To reduce data transfer latency over a network, network components can employ techniques such as remote direct memory access in which data from the memory of one computer can be written into the memory of another computer without involving the operating system. This allows the data to become available for a virtual machine or an end-user application much faster than if the operating system was involved. However, if erroneous or unexpected data is written directly into the memory of a target computer, the resulting error handling procedures can offset the benefits of direct memory access.

BRIEF DESCRIPTION OF THE DRAWINGS

Various embodiments in accordance with the present disclosure will be described with reference to the drawings, in which.

DETAILED DESCRIPTION

To reduce the latency of data transfers over a network, a network adapter device (e.g., a network interface card) can perform direct data placement (e.g., using remote direct memory access) of received data packets into a host computing device. Direct data placement allows data packets to be written into the host memory without being copied into intermediate operating system buffers, and thus makes the data available for access much faster than regular network traffic. In some implementations, the data packets are written into the host memory before firmware and/or software can perform checks on the data packets. This can cause erroneous or unexpected data to be placed into the host memory, and may cause user applications to hang or crash. In some scenarios, the erroneous or unexpected data can result in a fatal system error, requiring a system reboot to recover from the error.

A network adapter device can mitigate against direct placement of erroneous or unexpected data into the host computing device by providing a hardware acceleration engine to validate the received packets before placing them into the host computing device. The hardware acceleration engine can reduce the load on the local processor when processing heavy network traffic while maintaining the latency reduction benefits of direct data placement. The hardware acceleration engine may verify that the packet corresponds to a valid connection and that the packet has not been corrupted during transmission. In addition, the hardware acceleration engine may include packet validation circuitry to verify that the packet is within a sequence of packets that the network adapter device expects to receive, and that the packet is not a duplicate packet. If the packet has already been received previously or is not within the window of expected packets, the network adapter device can discard the packet to avoid the packet from being directly placed into the host computing device.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
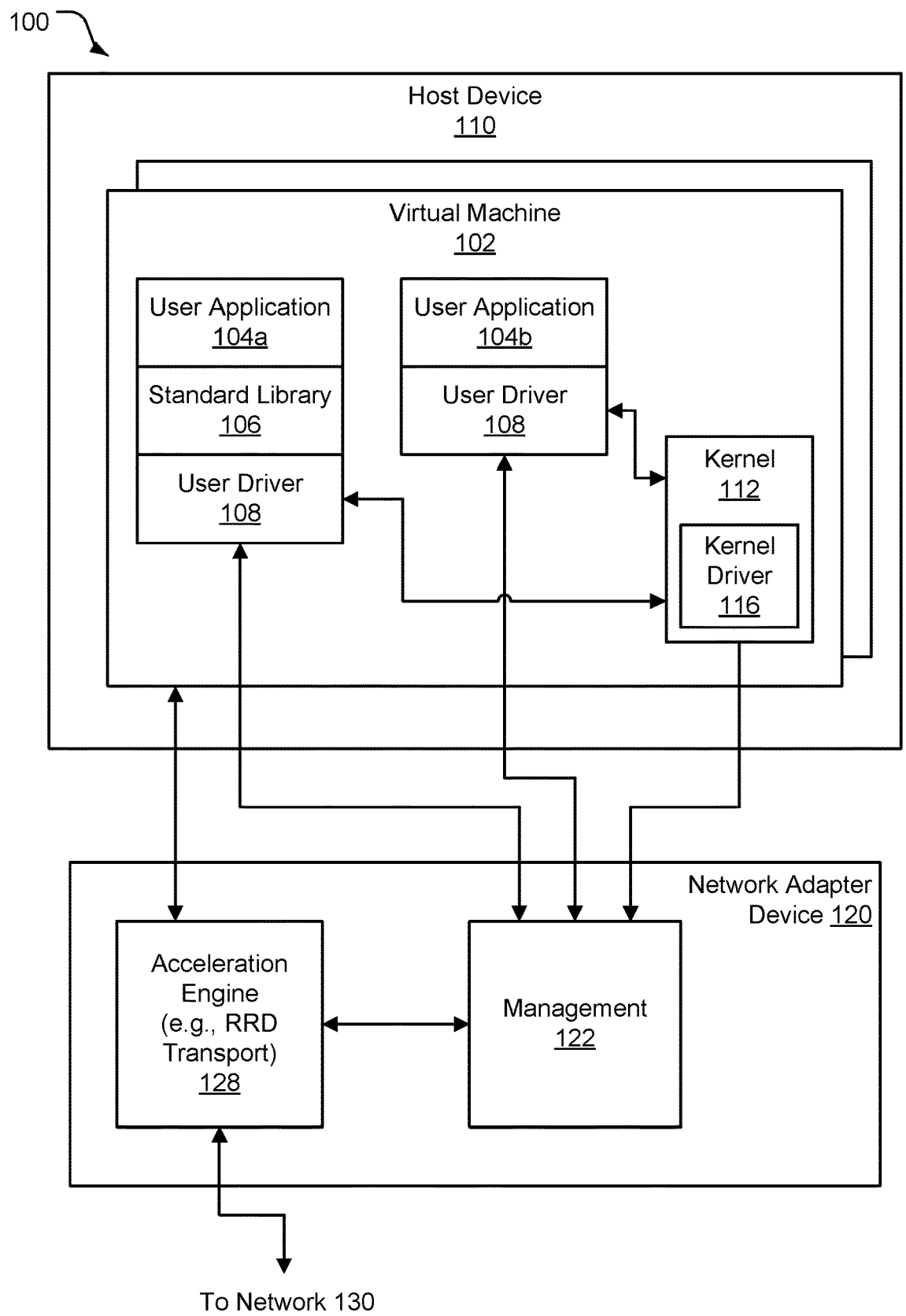
FIG. 1 illustrates an example of a system that includes a host device and a network adapter device, according to some aspects of the present disclosure.

FIG. 1 illustrates an example of a system 100 that may implement various aspects of the present disclosure. System 100 includes a host device 110 and a network adapter device 120. The host device 110 and the network adapter device 120 may be in communication over a physical connection, such as a cable, plug, socket, slot, printed circuit board, or combination of these physical components. The host device 110 may be referred to as a host computing device, and may include components such as one or more processors, memory subsystems, peripheral devices, and so on, not specifically illustrated. In some implementations, the operations of the network adapter device 120, described below, may be implemented in an integrated circuit device, and/or a collection of integrated circuit device. For example, in various implementations, the operation of the network adapter device may be implemented in a system-on-a-chip (SoC), a field-programmable gate array (FPGA), or an application-specific integrated circuit (ASIC), or a combination of these devices.

The host device 110 can be configured to execute one or more virtual machines 102. A virtual machine may execute programs, including an operating system, similar to a physical computer. Virtual machines generally operate in isolation from each other, where a process in a virtual machine does not affect processes running in a different virtual machine. Virtual machines may involve specialized hardware, software, a combination of hardware and software. Host device 100 may also implement a hypervisor to manage the virtual machines.

The virtual machine 102 may be execute one or more user applications 104*a-b*. User applications 104*a-b* may include, for example, high performance computing applications, other compute-intensive programs, and ordinary user applications, such as for example document editing tools and web browsers. In most implementations, user applications 104*a-b* may run in a "user space," such as an environment where they are isolated from each other, from the operating system (which typically runs in "kernel space"), and from the underlying hardware. The operating system kernel 112 may have more access privileges, including access to each of the user applications 104*a-b* and the underlying hardware.

The user applications 104*a-b* may communicate with system 100 hardware through a standard library 106 and/or user-space driver program 108. A standard library 106 provides an Application Programming Interface (API) for executing various operations. These operations may include, for example, frequently executed software operations and accesses to the system's 100 hardware. One category of standard libraries are ones that have been defined for kernel-bypass frameworks. These libraries include, for example, OpenFabrics Alliance (OFA) Open Fabrics Distribution (OFED) verbs library and LibFabric OpenFabrics Interfaces (OFI), an open source Linux library that implements Open-Fabrics interfaces, etc.

In some implementations, a standard library 106 may be in communication with a user-space driver program 108, where the user-space driver program 108 is configured to provide access to a specific hardware device. In some cases, a user application 104*b* may be able to communicate directly with the user-space driver program 108. The user-space driver program 108 may provide access to the network adapter device 120. The user-space driver program 108 may provide an interface between the abstraction provided by the standard library 106 and the specific hardware of the network adapter device 120. For example, the user-space driver program 108 may provide access to a communication stack, including send and receive queues, which may be located at the network adapter device 120.

In some implementations, the user applications 104*a-b* may communicate with the operating system kernel 112 for configuration operations. For example, the user applications 104*a-b* may register virtual addresses and memory regions with the kernel 112. In some implementations, the kernel 112 may include a kernel-space transport driver 116. The kernel-space transport driver 116 may be configured to execute control operations, including mapping of queue pairs to the user applications 104*a-b*, memory registration, and network address management.

The network adapter device 120 can be configured to communicate with a network 130. The network adapter device 120 may have a management module 122 that may be configured to execute send and receive operations. The management module 122 can be implemented, for example, using firmware or an integrated circuit, such as an FPGA or ASIC. For sending data over the network 130, the management module 122 may be configured to generate packets using a user application's message and to build packet headers. For receiving data from the network 130, the management module 122 may be configured to remove packet headers and transmit the received message towards the receiving user application 104*a-b*. The received message may, in some cases, include the address of the sender, or some other information identifying the sender.

The network adapter device 120 may send and/or receive data using one or more transport services, such as Relaxed Reliable Datagram (RRD) (may also be referred to as Scalable Reliable Datagram) transport. The network adapter device 120 may provide other transport services not specifically illustrated. In some implementations, the Relaxed Reliable Datagram transport may provide Reliable Connection-type behavior. In these implementations, a Relaxed Reliable Datagram context may be assigned to a single queue pair, making the transport context exclusive to one communication channel between one local user application and one remote user application. Message transfer using the Relaxed Reliable Datagram transport may be "connectionless," that is, may not require that user applications establish an explicit connection with a target application. Instead, connection management may be handled by the Relaxed Reliable Datagram transport service.

Additionally, the Relaxed Reliable Datagram transport service may guarantee delivery of packets, which may arrive at their destination out-of-order. This may mean that the packets may need to be re-ordered to place them in the same sequence as when they originated at the source system. Traditionally, packet ordering and reliability operations have been handled together, either at the network adapter or in host device software. Most high performance computing systems rely on the network to not drop packets to maintain peak performance. Dropped packets may result in packets arriving out of order (because one or more packets have not arrived), in which case the network adapter device may reject the out of order packets, or may require that the entire stream of packets be resent.

Another alternative would be for the network adapter device to re-order packets that have arrived out of order. Packet re-ordering, however, is generally a processing intensive operation. Network adapter devices typically have inexpensive and less powerful processors. Hence, implementations that attempt to deal with out-of-order packets generally re-order packets in host device software, to take advantage of the more powerful processors usually provided by a host device. In these implementations, the software has also attempted to ensure reliable packet delivery, including operations such as tracking and re-requesting missing packets. However, processor involvement may negatively impact latency. Thus implementations that seek reliable packet delivery can implement the reliability aspects in the hardware of the network adapter device.

Systems, such as the example system 100 of FIG. 1, using Relaxed Reliable Datagram transport may separate packet re-ordering and reliability operations, executing them at points in the system where they may be handled most efficiently. For example, system 100 may be configured such that reliable delivery of packets is handled by the network adapter device 120, which may be better suited for minimizing the latency inherent in transferring packets across the network 130. Furthermore, packet re-ordering may be handled by the user application 104*a-b* and/or a driver program 108, 116, each of which may be executing on the host device's 110 processor.

In some implementations, a packet acceleration engine 128 can be used to accelerate the transport service such as RRD by reducing the latency associated with transferring data between host device 110 and network 130. For example, packet acceleration engine 128 may include circuitry to perform direct data placement of packets into the application memory of virtual machine 102 of host device 110. Direct data placement can be used to write data directly into host device 110 without relying on management module 122 and the operating system of host device 110. As a result, data transferred over network 130 can be made available for consumption by the user applications faster than if the data was written in the normal manner through management module 122 and the operating system of host device 110. In some implementations, acceleration engine 128 may also include packet validation circuitry to validate packets before they are written into host device 110 to ensure that only correct packets that are expected can bypass management module 122 for direct placement into host device 110.

Figure 2:
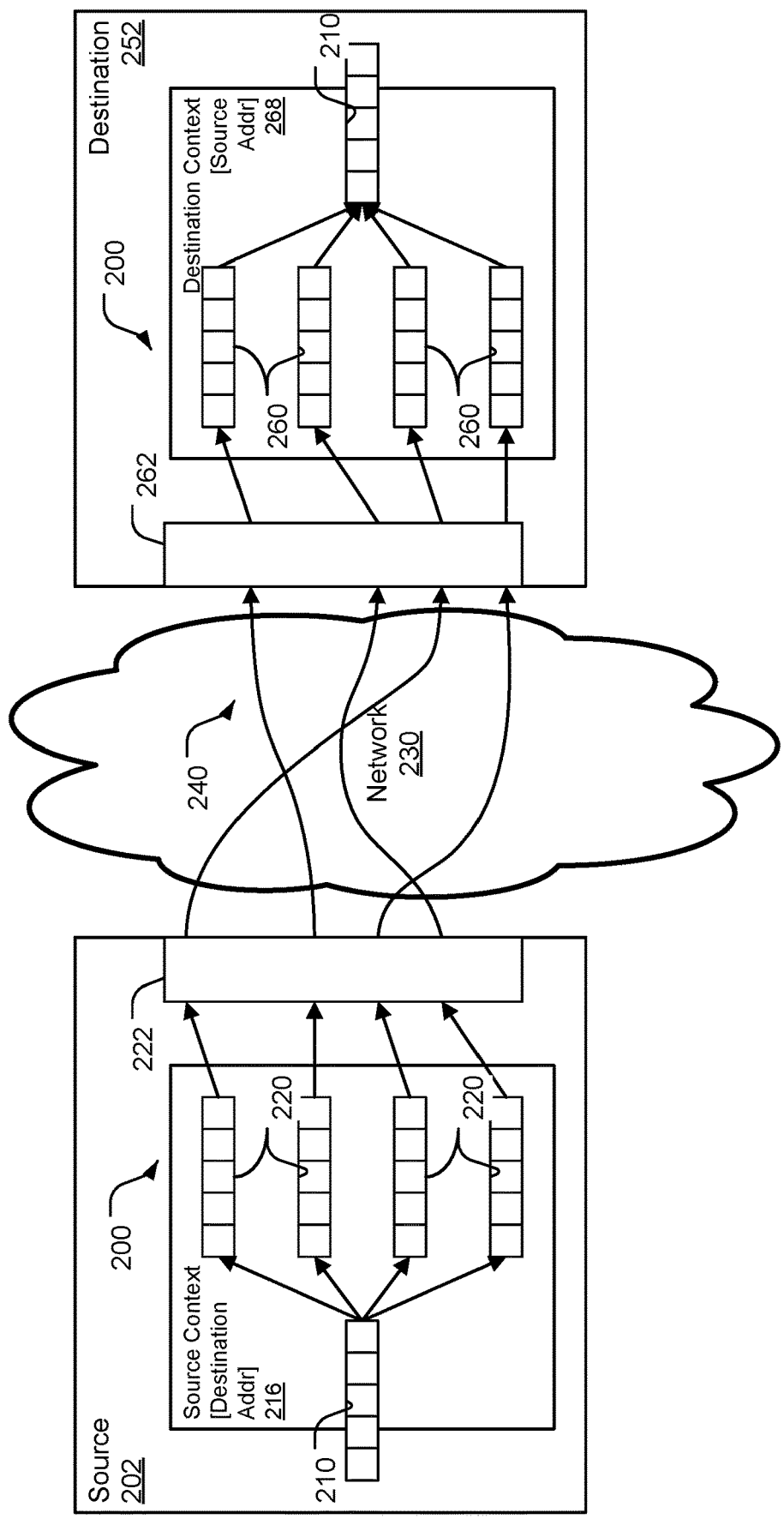
FIG. 2 illustrates an example of transferring data across a network using flowlets, according to some aspects of the present disclosure.

FIG. 2 illustrates an example of how the Relaxed Reliable Datagram transport such as that utilized by system 100 may manage multiple paths 240 across a network 230 to achieve greater utilization across available paths 240. In the example of FIG. 2, a flow 210 of packets from a source system 202 to a destination system 252 may be divided into groups of packets, which may be referred to as flowlets 200. A source transport context 216 and a corresponding destination transport context 268 may manage transmit and receipt of the flowlets 200, including setting up and taking down the paths across the network 230. The source and destination contexts 216, 268 may also monitor the status of packets on a per-flowlet 200 basis. Each flowlet 200 may be transmitting over a different path 240, with all packets in one flowlet 200 using the same path. In some implementations, all packets are transmitted from the source system 202 over one port 222, and are received at the destination system 252 at one port 262. In other implementations, the source system 202 and/or the destination system 252 may have multiple ports connected to the network 230.

In a Relaxed Reliable Datagram transport implementation, a source context 216 is typically associated with one, specific destination context 268. The source context 216 in most cases is identified by an address associated with the destination system 252. This destination address is assigned to the destination context 268. Similarly, the destination context 268 may be identified by an address at the source system 202 that has been assigned to the source context 216. The source context 216 may manage transmission of a flow 210 of packets, which may include packets from multiple user applications running at the source system 202. The packets in the flow 210 would all be destined for user applications running on the destination system 252. The destination context 268 may manage receipt of the packets in the flow 210 at the destination system 252.

In some implementations, the source system 202 may initialize a new flowlet 200 when the address associated with the destination context 268 is mapped for the first time. Once the first flowlet 200 in the example of FIG. 2 has been initialized, additional flowlets 200 may be established. Connection establishment messages may be attached to normal network traffic, and typically involve the source system 202 sending a connection request to the destination system 252, and the destination system 252 responding by sending an acknowledgement message back to the source system 202. In some implementations, flowlets 200 can be unidirectional in which flowlets 200 originate at the source system 202 and terminate at the destination system 252. The same source context 216 and destination context 268 may be used to establish flowlets originating at the destination system 252 and terminating at the source system 202, though in some implementations these can be a different set of flowlets than those illustrated in the example of FIG. 2, which can be managed separately.

FIG. 2 illustrates four flowlets 200 by way of example. In various implementations, more or fewer flowlets 200 may be used by the transport contexts 216, 268. In some implementations, the number of flowlets 200 between the source system 202 and the destination system 252 may be configurable, and/or may be limited by the number of available paths 240 between the two systems 202, 252.

Typically, flowlets 200 are only known to the transport contexts 216, 268, and are independent of queue pairs, virtual machines, or user applications. Stated another way, user applications running on the source system 202 and the destination system 252 are unaware of the flowlets 200, and may interacting only with standard libraries and/or driver programs. Packets from various sources may be placed into the same flow 210 when the packets are addressed to the same destination system 252. Packets from flow 210 may be assigned to flowlets 200 such that the packets are distributed evenly across the flowlets 200. Alternatively or additionally, packets may be assigned so that flowlets 200 that are running low on packets are prioritized. Flowlets 200 that run low quickly may be using faster paths, and so assigning packets to these flowlets 200 may improve overall utilization and throughput.

The source context 216 may track packets on a per-flowlet basis. Each flowlet 200 may maintain a packet serial number (PSN) such as a packet sequence number, and as packets from flow 210 are assigned to a flowlet, each packet may also be assigned the next packet serial number in the sequence for that flowlet. Packets may also be assigned a flowlet identifier, which may be used by the destination context 268 to identify each packet's flowlet.

For each flowlet, the source system 202 may maintain status information 220 for each packet assigned to the flowlet. The status information 220 may include each packet's PSN and any information that may be needed to retransmit a packet. In most cases, the status information 220 may be maintained for a packet from the time the packet is transmitted until the source system 202 receives an acknowledgment that the packet was received. The source context 216 may maintain status information 220 for only a limited number of outstanding packets per flowlet 200. For example, the source context 202 may be configured to only allow a certain number of outstanding packets (e.g., 32 packets) per flowlet 200. The number of outstanding packets per flowlet 200 may be fixed or may be configurable. When a flowlet 200 is very slow (e.g., acknowledgements are slow to arrive, or never arrive at all), the source context 202 may move the flowlet 200 to another path 240.

The destination context 268 may also track packets on a per flowlet 200 basis, with its own status information 260. The status information 260 maintained by the destination context 268 may also include PSNs for each flowlet 200. As will be explained in further detail below, the destination context 268 may use the status information 260 to generate acknowledgements that are transmitted to the source system 202. Acknowledgements may inform the source context 202 that packets for a particular flow have arrived at the destination system 252, and typically indicate which packets have arrived. In some implementations, source context 202 may use the acknowledgements as a trigger to start sending additional packets.

Flowlets 200 may be active or idle. Active flowlets can have outstanding packets that have been sent but have not yet been acknowledged by the destination context 268. Idle flowlets have no packets outstanding, and also have no packets waiting to be sent. When a flowlet is idle, the source context 216 may decide to move the flowlet to a different path. IN some implementations, the source context's decision to move an idle flowlet to another path is made on a random basis, rather than systematically (e.g., at fixed times or every time a flowlet becomes idle). Moving idle flowlets to other paths may allow the source context 216 to attempt to find less busy paths 240 across the network 230.

Packets from each flowlet may be transmitted by the source system 202 in the order of their PSNs. The first packet sent from a flowlet may also include a "start-of-sequence" indicator to inform the destination context 268 that the particular flowlet is starting. The destination context 268 may then use the PSN in the packet with the start-of-sequence indicator to establish the status for that flowlet 200. The destination context 268 subsequently expects packets for that flowlet 200 to arrive, and in some cases, in the order of their PSNs. Hence, for example, packets from one flowlet may be transmitted by the source system 202 with PSNs "1, 2, 3, 4, 5 . . . " with the first packet including a start-of-sequence indicator. The destination system 252 may receive the first packet, take note of the start-of-sequence indicator, and subsequently expect packets with PSNs "2, 3, 4, 5 . . . " to arrive for that flowlet 200.

Packets, however, may be dropped in the network 230, and may never arrive at the destination system 252. For example, the destination system may receive packets with PSNs "1, 3," which can indicate that the packet with PSN "2" may have been dropped. The packet status maintained by both the source context 216 and the destination context 268 may enable the contexts to identify when packets have been dropped in the network 230, and to retransmit any packets that were lost.

Drops in the network 230 and slowness caused by excessive use of links in the network 230 may affect performance. The source context 216 may detect excessive drops or congestion along one path 240 in a number of ways. For example, the status information 220 for a flowlet may include a timer that the source context 216 can use to determine the time between when a packet was transmitted and when an acknowledgment for that packet was received. A long time period may indicate congestion along the path being used by the flowlet. Alternatively or additionally, the source context 216 may track how quickly it can add packets to each flowlet. A flowlet that cannot accept packets as quickly as other flowlets may be suffering congestion along its path across the network, and/or may be suffering excessive drops. Alternatively or additionally, the source context 216 may be receiving a large number of retransmission requests for a particular flowlet, which may indicate excessive drops along the path the flowlet is using.

When the source context 216 determines that a flowlet may be suffering from congestion or excessive drops, the source context 216 may move the flowlet to another path. In some implementations, once the flowlet has been moved, the destination context 252 will continue to receive and accept the packets from the flowlet, even though a path identifier may have now changed. In some implementations, the source context 216 may cause the relocated flowlet to send a new start-of-sequence indicator along with the packet with the oldest unacknowledged packet sequence number. In these implementations, upon receiving the new start-of-sequence indicator, the destination context 268 may assume that the source system 202 has given up on any packets it sent before the packet with the new start-of-sequence indicator, and discard any information (for example, packet sequence numbers) it had about the restarted flowlet 200.

In some cases, the destination context 268 may receive a start-of-sequence indicator in a packet that has arrived out of order. For example, the destination context 268 may receive packets with PSNs "1, 2, 3, 1" where both packets with the sequence number "1" are copies of the same packet, and have the start-of-sequence indicator. This may occur, for example, when the flowlet's 200 path 240 is particularly slow, and an acknowledgment for the first packet with the sequence number "1" was very slow to arrive at the source system 202. Due to this slowness, the source system 202 may have switched paths and restarted the flowlet prior to receiving the acknowledgement. In this situation, the destination context 268 may recognize that it need not reset the flowlet 200 state upon receiving the second packet with the PSN "1." Instead, the destination context 268 may recognize the first packet with the packet sequence number "1" as the start of the sequence, and may ignore any additional packets that arrive with both the packet sequence number "1" and the start-of-sequence indicator set. In some implementations, the destination context 268 may send acknowledgments indicating that the additional packets were not accepted, which may assist the source context 216 in understanding the situation.

In some implementations, the destination context 268 may be configured to accept packets that arrive out of order. The destination context 268, in cooperation with the source context 216, can ensure that all expected packets are received, and is typically not concerned with the order in which those packets are received. The destination context 268 typically forwards packets to a destination-side host device as soon as the packets are received (e.g., using direct data placement), and any re-ordering of the packets can be left to the host device. It should be noted that packets may be received in a different order at the destination end of the flow 210 from the order they were sent at the source end of the flow 210.

As discussed above, the source context 216 and the destination context 268 may each maintain status information 220, 260 for each individual flowlet. Using the status information 220, 260, the source and destination contexts 216, 268 may ensure that every packet in the flow 210 reaches the destination system 252.

Figure 3:
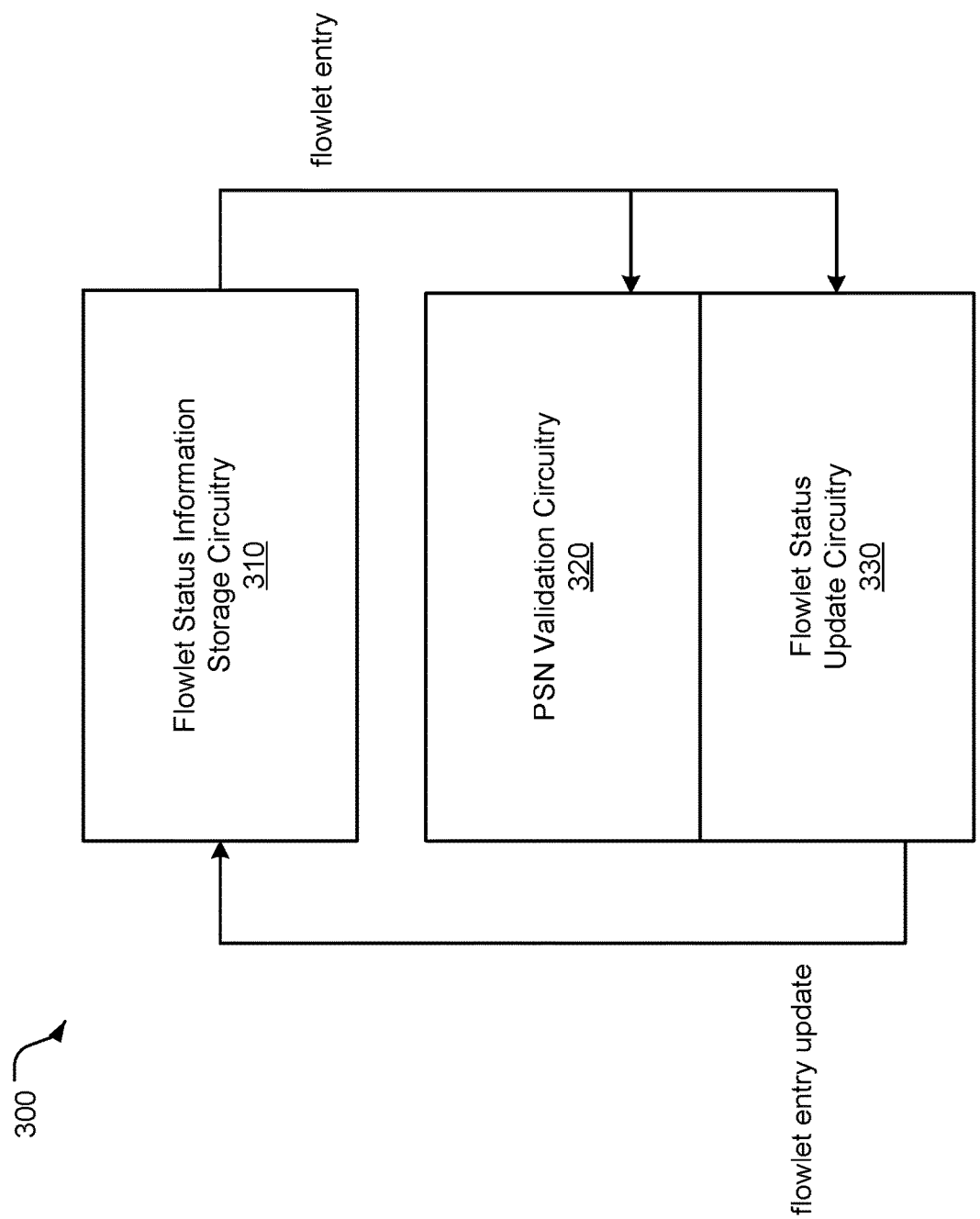
FIG. 3 illustrates an example of a block diagram of packet validation circuitry, according to some aspects of the present disclosure.

FIG. 3 illustrates an example of a packet validation block 300 that can be implemented in an integrated circuit device such as a hardware acceleration engine of a network adapter device. Packet validation block 300 can be used to prevent erroneous packets from being written to a host computing device by verifying that a packet intended for direct data placement is a packet that the device expects to received, and that the packet is not a duplicate packet. Packet validation block 300 may include flowlet status information storage circuitry 310, packet serial number (PSN) validation circuitry 320, and flowlet status update circuitry 330.

Storage circuitry 310 may store status information of one or more flowlets being received by the network adapter device. For each flowlet, storage circuitry 310 may store status information indicating whether each packet in a sequence of packets of the corresponding flowlet has been received. For example, the status information can be in the form of a data structure representing a sliding window of a predetermined number of sequential packets associated with a flowlet. The predetermined number of sequential packets in the sliding window can be fixed, or can be configurable, for example, via a configuration register. The size of the sliding window (e.g., the number of sequential packets in the sliding window) can be determined based on the number of outstanding packets (e.g., packets sent but not yet received) allowed in the system. The number of outstanding packets can depend on the network configuration and/or conditions (e.g., network latency, traffic congestion, etc.) between the source and destination of the flowlet. In some implementations, the size of the sliding window can be set to be the same for all flowlets, or can be configured independently for each flowlet.

By way of example, if the window size is set to be 32 packets for each flowlet, then the status information for that flowlet may include a scoreboard of 32 transport status indicators, where each transport status indicator indicates whether a corresponding packet has been received. In some implementations, each transport status can be represented in a data structure as a single data bit (e.g., a 1-bit transport status bit), where a value of "0" may indicate that the packet has not been received and a value of "1" may indicate that the packet has been received (or vice versa). Thus, for a window size of 32 packets, storage circuitry 310 may include, for each flowlet, a 32-bit register to store 32 transport status bits (one bit for each packet in the window).

As packets are received and written into the host computing device, the sliding window can be advanced to provide status information for the next set of outstanding packets. To keep track of the starting packet of the sliding window, the status information may include a PSN base that indicates the PSN of the first packet of the sliding window. For example, when a flowlet is first established, the PSN base can be set to "1" to indicate that the first packet being tracked in the sliding window has a PSN of "1." In some implementations, the sequence of expected packets may have sequential PSNs. In other words, the PSNs of the sequence of packets being expected can be "1, 2, 3, . . . 31, 32." As such, it is not necessary to store a separate PSN for each packet being tracked in the sliding window because the PSN of each packet in the sliding window can be derived from the PSN base. This can minimize the storage size and layout area of storage circuitry 310. The same storage optimization can be applicable to implementation in which the PSN is algorithmically derived, because each subsequent PSN can be algorithmically derived from the previous PSN. In other implementations, storage circuitry 310 may store a corresponding PSN for each packet in the sliding window of sequential packets being tracked.

In some implementations, the data structure used to implement storage circuitry 310 can referred to as a flowlet table that stores status information for each flowlet being used to transmit packets to the host computing device. Each entry in the flowlet table may correspond to a flowlet, and can be referred to as a flowlet entry. Each flowlet entry may include a PSN base representing the first packet at the beginning of the sliding window, and a transport status bit for each of the sequential packets in the sliding window to indicate whether the corresponding packet of the sliding window has previously been received by the network adapter device.

During operation, storage circuitry 310 can be enabled when the network adapter device determines that direct data placement (DDP) is to be performed on a received packet or flowlet. For example, the received packet itself and/or the flowlet context associated with the packet may include information indicating that DDP is to be performed, and a DDP enable signal can be asserted as an enable signal to storage circuitry 310. The flowlet identifier can be parsed from the received packet and be provided to storage circuitry 310 as an index to retrieve the flowlet entry associated with the flowlet that transported the packet. The retrieved flowlet entry can then be provided to PSN validation circuitry 320, and flowlet status update circuitry 330.

Validation circuitry 320 may include validation logic circuits to perform a packet serial number (PSN) validation process to validate a packet being received by the network adapter device. In some implementations, the PSN validation process can be a hardware validation process performed in the hardware without relying on firmware and/or software validation of the packet. The PSN validation process may include validating that a PSN of the packet being received by the network adapter device corresponds to one of the sequential packets of the sliding window. The PSN validation process may also include validating that a transport status associated with the PSN indicates that the packet is being received for the first time. In some implementations, the PSN validation process can be the last check performed on the packet by the network adapter device before direct placement of the packet into the host computing device. Thus, validation circuitry 320 can be enabled by a connection valid signal that is asserted when a received packet has passed all other validation checks performed by the network adapter device. Examples of these other validation checks that can be performed prior to the PSN validation process may include verifying a checksum of the packet to ensure the data integrity of the packet, performing a static header validation process to verify other header fields of the packet such as verifying that the flowlet number associated with the packet is a valid and active flowlet, verifying a connection signature of the packet that was used to establish the flowlet connection, etc.

During operation, validation circuitry 320 may receive a PSN of a packet, and a flowlet entry from storage circuitry 320. The PSN can be parsed from, for example, a header field of the received packet. The flowlet entry provided by storage circuitry 320 is associated with the flowlet that transported the packet, and may include a PSN base and a scoreboard of transport statuses for a window of sequential packets starting the PSN base. Validation circuitry 320 may verify that the PSN of the packet corresponds to one of the sequential packets in the flowlet entry. For example, validation circuitry 320 may include logic circuits to verify the condition $PSN\_base \leq PSN \leq (PSN\_base + window\_size)$. If the PSN of the packet belongs to one of the sequential packets in the window being expected, validation circuitry 320 may assert a PSN window valid signal to indicate that this condition is met. If the PSN of the packet is outside of the window of sequential packets of the flowlet entry, the PSN window valid signal may remain deasserted, and the packet can be discarded because the received packet is not a packet that is expected at this time.

Validation circuitry 320 may also verify that the packet being validated is being received for the first time and is not a duplicate packet. This can be achieved by examining the transport status associated with PSN in the flowlet entry. For example, validation circuitry 320 may include logic circuits to verify the condition $Scoreboard[PSN-PSN\_base]=0$. If the packet being processed has already been received previously, validation circuitry 320 may assert a PSN already received signal to indicate that this is a duplicate packet. The received packet can be discarded because this packet may have already been written to the host computing device. If the packet is being received for the first time and is within the window of sequential packets, data placement circuitry may perform direct data placement of the packet to place the packet into the host computing device in response to the packet being validated. Furthermore, validation circuitry 320 may notify status update circuitry 330 to update the transport status associated with the PSN in the flowlet entry to indicate that the packet with the corresponding PSN has been received and validated.

Status update circuitry 330 may include update logic circuits to update the flowlet entry in the flowlet table stored in storage circuitry 310 in response to validation circuitry 320 validating a received packet associated with the flowlet entry. Status update circuitry 330 may update the transport status associated with the PSN of the received packet to indicate that a packet has been received. For example, status update circuitry 330 may include logic circuits to set $Scoreboard[PSN-PSN\_base]=1$ to indicate reception and validation of the packet. When one or more packets at the beginning of the sliding window has been received and validated, status update circuitry 330 may also advance of shift the sliding window by the number of packets starting from the beginning of the sliding window that have been validated by the network adapter device. For example, status update circuitry 330 may include logic circuits to set a shift value to be the number of consecutive packets starting with the PSN base in the scoreboard that has a transport status indicating the packet has been received and validated. The PSN base of the flowlet entry can then be incremented by the shift value, and the scoreboard of transport statuses for the flowlet can be shifted by the shift value. This shifting operation will allow the flowlet entry to start tracking the reception status of the next packets on the flowlet being expected.

In some implementations, the network adapter device may refrain from sending an acknowledgement to the flowlet source for each packet that is received. Instead, the network adapter device may send an acknowledgment only when status update circuitry 330 advances the sliding window of a flowlet entry. In other words, the transmission of an acknowledgement to a sender device of the packet can be suppressed until one or more packets at a beginning of the sliding window have been received. The acknowledgement can be used to notify the sender device to send additional packets. Thus, this mechanism can prevent the flowlet source from sending new packets until at least the first packet in the window of sequential packets has been received and validated by the network adapter device, and may minimize the amount of reordering operations when the packets of the flowlet are received out of order.

In some implementations, if the flowlet source expects an acknowledgement for each packet that the source transmits, the network adapter device can send the same number of consecutive acknowledgements as the shift value set by status update circuitry 330. Alternatively, the network adapter device may send an acknowledgement together with the shift value to inform the flowlet source how many new packets the flowlet source can begin to transmit.

Figure 4:
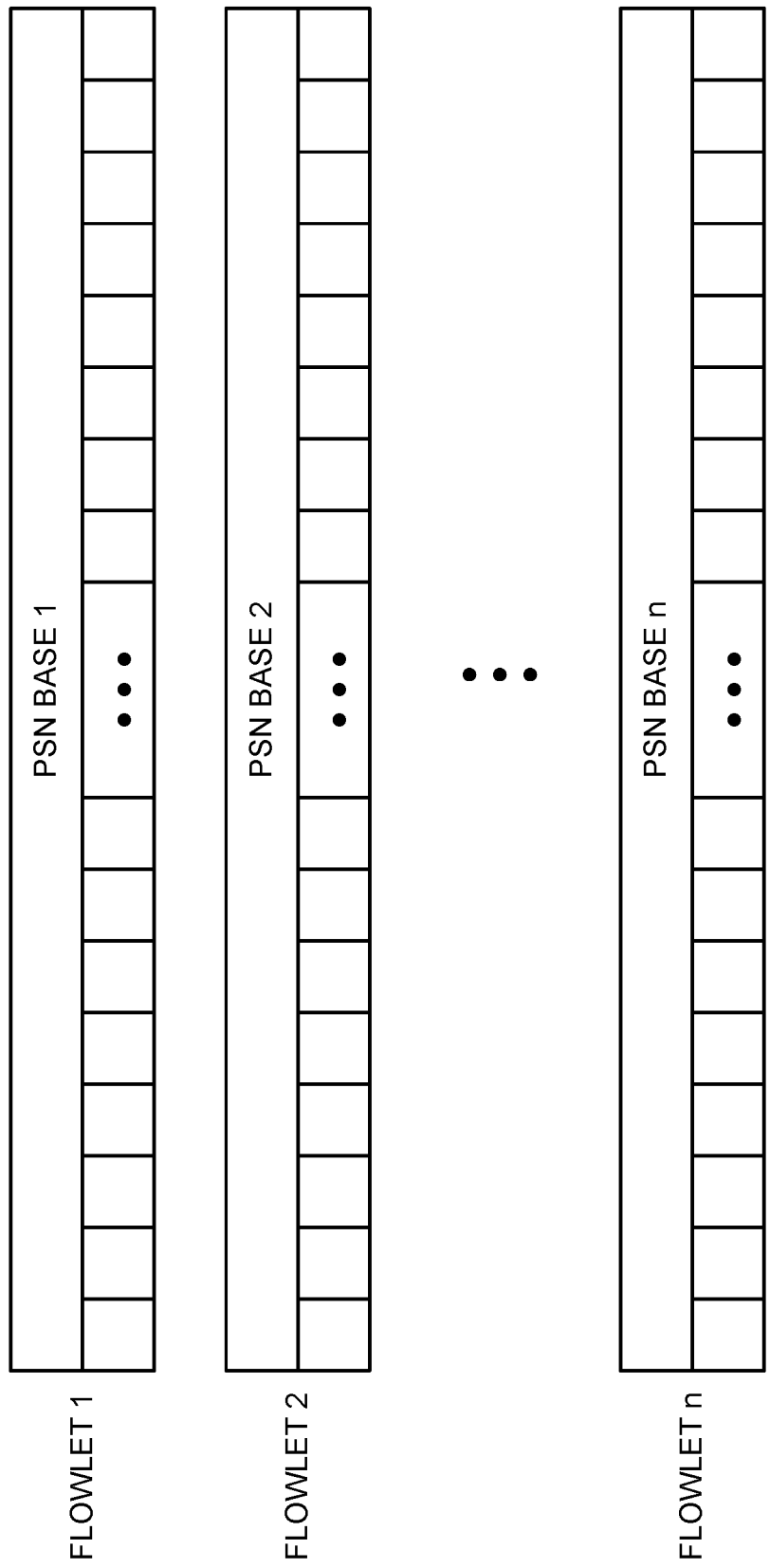
FIG. 4 illustrates an example of a data structure for storing packet status information, according to some aspects of the present disclosure.

FIG. 4 illustrates an example of a data structure 400 for implementing a flowlet table used by a packet validation block of a network adapter device. The flowlet table may include n number of flowlet entries. Each flowlet entry is associated with a different one of flowlets 1 to n, and each flowlet entry may include a PSN base value and a scoreboard of transport status bits. In the example shown in FIG. 4, the size of the sliding window of sequential packets for each flowlet can be configured to be the same (e.g., 32 packets). The scoreboard of transport status bits may include one bit for each packet in the sliding window. Thus, if the window size is 32 packets, then each flowlet entry may have 32 transport status bits. In some implementations, the PSN base can be a 32-bit number. Thus, the data structure in this example can be implemented using a set of 32-bit registers, where each flowlet entry uses two 32-bit registers, in which the one 32-bit register is used to store the PSN base associated with the flowlet, and one 32-bit register is used to store the transport status bits. A flowlet number or flowlet identifier can be used as an address or index to retrieve the flowlet entry associated with the flowlet of a received packet.

It should be noted that data structure 400 is just one example, and that the flowlet table can be implemented using other data structures. For example, instead of two 32-bit registers, each flowlet entry can be implemented as a single 64-bit register, four 16-bit registers, etc. In some implementations, the PSN base can have more or less number of bits than the number of bits in the transport status scoreboard for a flowlet. Furthermore, the window size of different flowlets can also be different, and thus the number of transport status bits per flowlet can be different for different flowlets.

Figure 5:
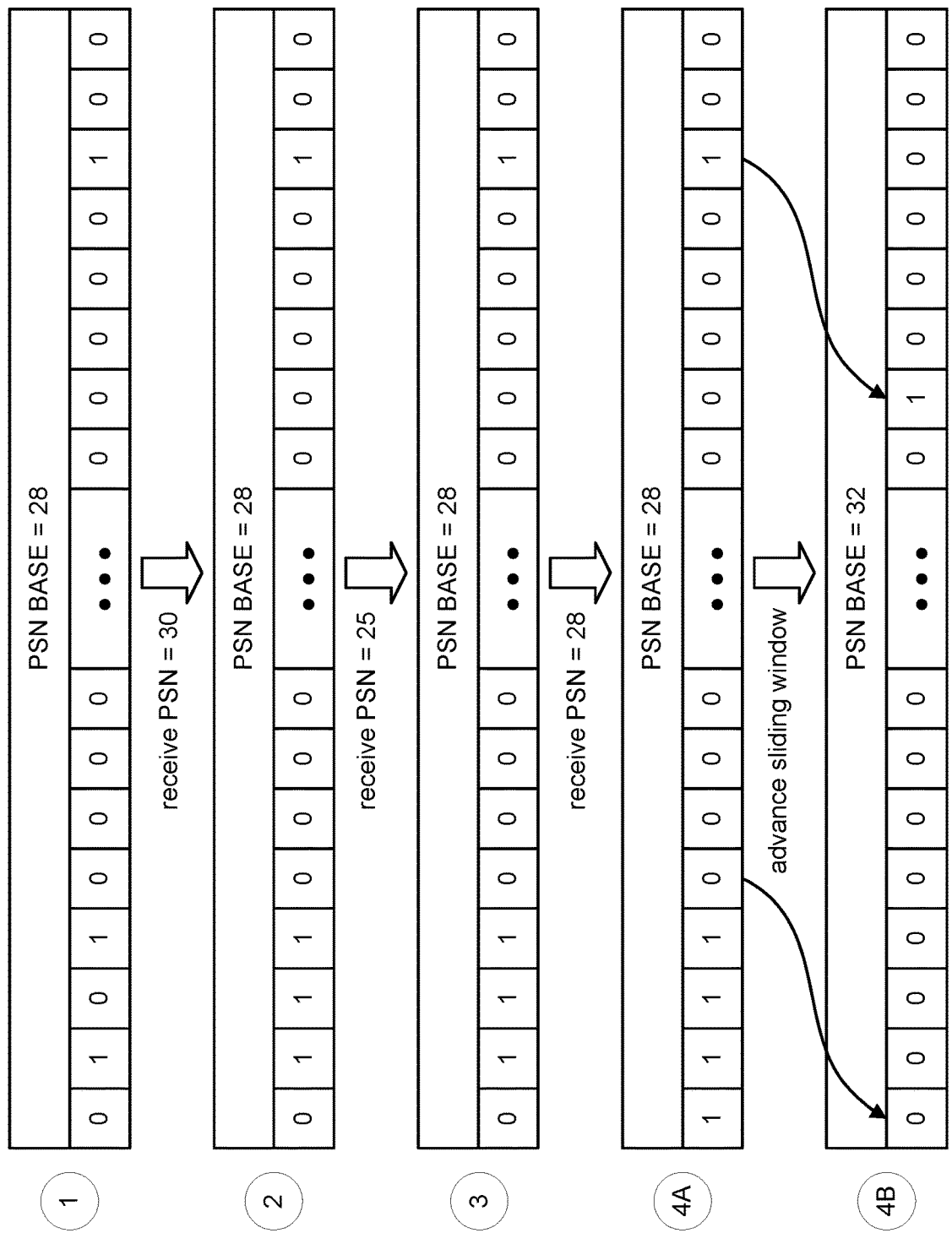
FIG. 5 illustrates an example of updating packet status information, according to some aspects of the present disclosure.

FIG. 5 shows an example of a flowlet status update process performed by a packet validation block. For ease of explanation, FIG. 5 illustrates the status update for one flowlet as various packets are being received on the flowlet. The sliding window in this example may have a size of 32 packets, and thus the scoreboard may have 32 transport status bits (Scoreboard[0:31]), although only the first 8 status bits and last 8 status bits are shown. The least significant bit of the scoreboard representing the transport status of the PSN base is shown on the left.

At time 1, the flowlet entry for this particular flowlet may have a PSN base of 28. This may mean that the first 27 packets with PSNs 1 through 27 for this flowlet have already been received, and the current sliding window is tracking packets with PSNs 28 through 59. Furthermore, as Scoreboard[1], Scoreboard[3], and Scoreboard[29] each has a value of "1", this may mean that packets with PSNs of 29, 31, and 57 have been received.

At time 2, a packet with a PSN of 30 is received for this flowlet. This packet has a PSN that is within the current window of sequential packets being tracked, and Scoreboard[2] has a value of "0" to indicate that this packet is being received for the first time. As such, this packet is validated and can be placed into the host computing device. The flowlet entry is also updated by setting Scoreboard[2] to "1" to indicate that the packet with PSN of 30 has been received and validated. At this time, the sliding window is not advanced because the packet at the beginning of the sliding window with a PSN of 28 has not yet been received.

At time 3, a packet with a PSN of 25 is received for this flowlet. However, the PSN for this packet is not within the sliding window because the PSN is not between and inclusive of 28 through 59. As such, this packet can be discarded. Similarly, if a packet with a PSN of 29, 30, 31, or 57 is received, the packet can be discarded because packets with these PSNs have already been received previously.

At time 4A, a packet with a PSN of 28 is received for this flowlet. This packet has a PSN that is within the current window of sequential packets being tracked, and Scoreboard[0] has a value of "0" to indicate that this packet is being received for the first time. As such, this packet is validated and can be placed into the host computing device. The flowlet entry is also updated by setting Scoreboard[0] to "1" to indicate that the packet with PSN of 28 has been received and validated.

At time 4B, the packet validation block advances the sliding window because the packet at the beginning of the sliding window with a PSN of 28 has been received. The sliding window is advance by four packets, because four consecutive packets with PSNs 28 through 31 at the beginning of the sliding window have been received. Thus, the PSN base is updated to 28+4=32, and the transport status bits in the scoreboard is shifted over by four bits as indicated in FIG. 5. The updated scoreboard thus contains transport status bits for packets with PSNs 32 through 63. As the scoreboard has been advanced, an acknowledge signal can also be sent to the flowlet source to notify the flowlet source that the network adapter device and host computing device are ready for the next four packets in this flowlet to be transmitted. It should be noted that although the flowlet status changes at times 4A and 4B are shown separately, these modifications to the flowlet status can be part of an atomic operation.

Figure 6:
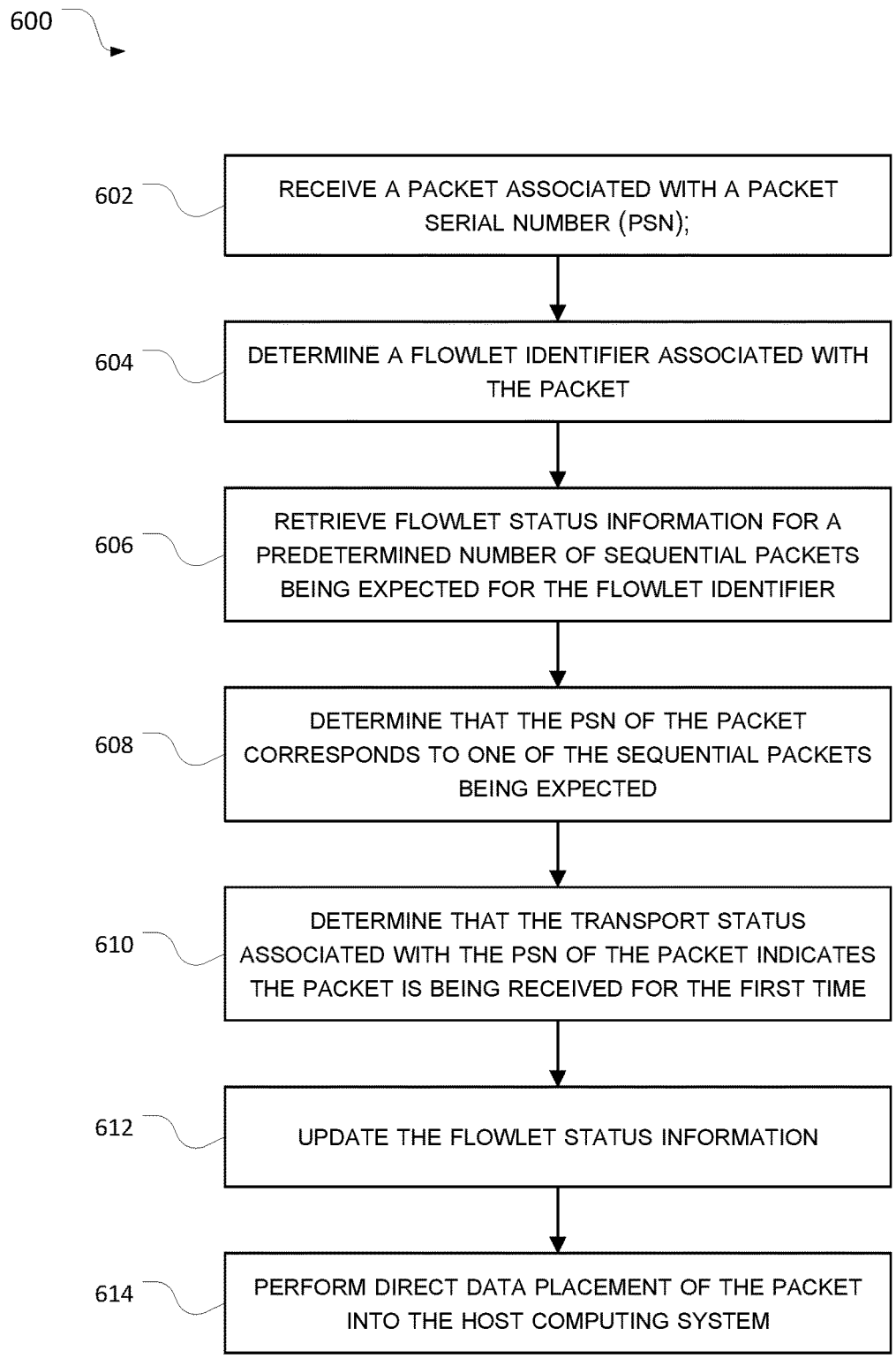
FIG. 6 illustrates an example of a flow diagram of a packet validation process, according to some aspects of the present disclosure.

FIG. 6 illustrates a flow diagram of a packet validation process 600 according to some implementations. Packet validation process 600 can performed, for example, by packet validation circuitry of a hardware acceleration engine in an integrated circuit device (e.g., a receiver device such as a network adapter device that receives packets from a sender device). Packet validation process 600 can be used to validate a packet prior to the network adapter device storing the packet (e.g., via direct data placement) in a host computing device. This can prevent erroneous or unexpected packets from being written into the host computing device memory.

At block 602, a packet targeted for a host computing device is received. The packet can be received via a flowlet, and may be associated with a packet serial number (PSN). The packet may include the PSN as part of the packet header. The PSN can be used to indicate the position of the packet in a sequence or order of packets of the flowlet. In some implementations, the PSN can be a sequential number that increments in the order in which the packets are sent along the flowlet from the source (e.g., a sender device on the network).

At block 604, a flowlet identifier associated with the received packet is determined. In some implementations, the packet may include a flowlet identifier such as a flowlet number in the packet header to identify the flowlet connection that the packet is being transported on, and the flowlet identifier can be parsed from the header of the packet. In some implementations, the flowlet identifier can be determined by a combination of header fields of the packet such as a combination of address and/or port information in the header of the packet.

At block 606, the flowlet identifier determined at block 604 can be used to retrieve flowlet status information for a sliding window of a predetermined number of sequential packets being expected for the flowlet identifier. The flowlet status information can be stored as a flowlet entry in a data structure, and the flowlet identifier of the received packet can be used an index or address to access the flowlet entry. The flowlet status information may include a PSN base, and a transport status for each of the sequential packets in the sliding window to indicate whether that packet has already been received. The PSN base may correspond to the PSN of the initial packet of the sequential packets. In other words, the first packet at the beginning or start of the sequence of packets being tracked in the sliding window may have a PSN being equal to the value of the PSN base. In some implementations, the transport status can be represented using a scoreboard that has a data bit for each of the sequential packets of the sliding window. As packets are received on the flowlet with a PSN corresponding to one of the sequential packets in the sliding window, the polarity of the data bit can be flipped to record the reception of the packet in the flowlet entry.

At block 608, the received packet can be validated as belonging to the sliding window of sequential packets being expected. For example, the packet can be validated by determining that the PSN of the packet corresponds to the PSN of one of the sequential packets being expected by checking that the PSN of the packet is greater than or equal to the PSN base, and that the PSN of the packet is less than the sum of the PSN base and the window size. If a packet is received having a PSN that is determined to not correspond to any of the sequential packets being expected (e.g., having a PSN that is outside of the sliding window), the packet can be discarded to prevent the packet from being written into the host computing device.

At block 610, the received packet can additionally be validated as being a new packet (e.g., not a duplicate packet) received by the network adapter device. For example, the packet can be validated by determining that the transport status associated with the PSN of the packet in the flowlet entry indicates that a packet having this PSN is being received for the first time, and hence is not a duplicate packet that has already been received previously. If a packet is determined to be a duplicate packet that has already been received for the flowlet as indicated by a transport status associated with the PSN of the packet, the packet can be discarded to prevent the packet from being written into the host computing device.

At block 612, the flowlet status information associated with the corresponding flowlet of the received packet can be updated in response to the packet being validated as described above with respect to blocks 608 and 610. The flowlet status information update may include modifying the transport status of the packet to indicate that the packet has been received. If one or more packets at the beginning of the sliding window of sequential packets is received, the flowlet status information update may also include increasing the PSN base by a number of consecutive packets starting with the initial packet that have been received and validated. Thus, the PSN base can be updated to a PSN of a next packet of the sequential packets on the flowlet that has not yet been received. When the PSN base is updated, the sliding window is also advanced or shifted by the same number of consecutive packets starting at the beginning of the sliding window that have been received. For example, the data bits representing the transport statuses can be shifted in a shift register by the number of consecutive packets at the beginning of the sliding window that have been received and validated.

At block 614, in response to the packet being validated as described above with respect to blocks 608 and 610, direct data placement of the packet can be performed to write the packet into the host computing device. The direct placement of the packet into the host computing device's memory can be performed without writing the packet into any operating system buffers (e.g., zero copy) to reduce the latency of transferring data to the host computing device. Because the packet has been validated by the network adapter device as being a new packet that is expected to be received, the likelihood of a duplicate or erroneous packet being directly placed into the host computing device can be reduced.

Although certain aspects of the packet validation technique have been described with respect to Relaxed Reliable Datagram (RRD) transport and using flowlets for the transport, it should be understood that the PSN validation technique described herein can be applied to other types of data transport. Furthermore, the PSN validation technique described herein can also be employed to validate packets that are written into a host computing device using techniques other than direct data placement.

Figure 7:
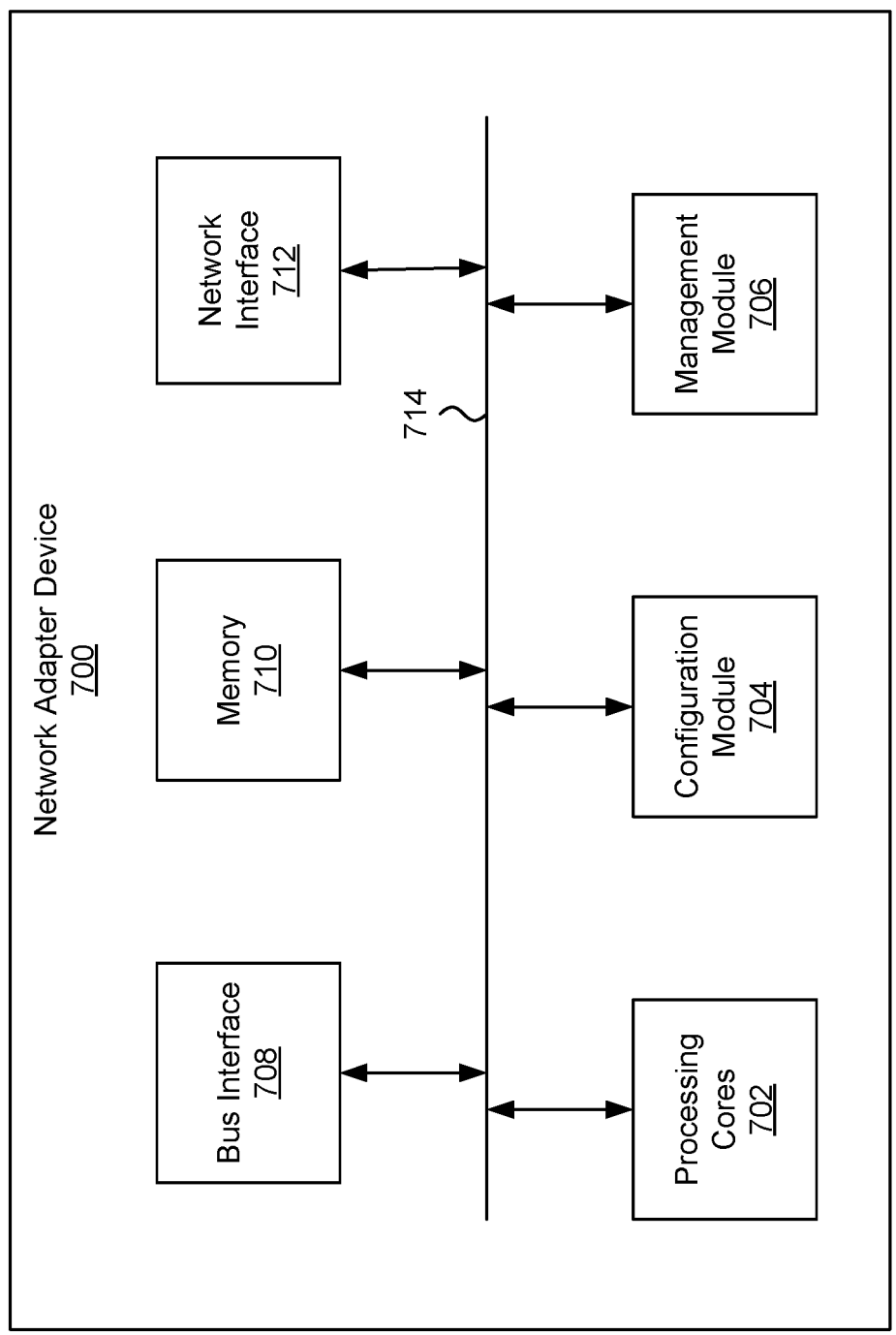
FIG. 7 illustrates an example of a block diagram of a network adapter device, according to some aspects of the present disclosure.

FIG. 7 illustrates an example of a network adapter device 700 that may be used to implement the systems and methods described herein. In this example, the network adapter device 700 may include one or more processing cores 702, a configuration module 704, a management module 706, a bus interface module 708, memory 710, and a network interface module 712. These modules may be hardware modules, software modules, or a combination of hardware and software. The network adapter device 700 may include additional modules and/or circuitry not specifically illustrated here, such as modules for providing specific transport services and/or acceleration engines. In some implementations, the network adapter device 700 may include fewer modules than shown. One or more of the modules may be in communication with each other over a communication channel 714. The communication channel 714 may include one or more buses, meshes, matrices, fabrics, a combination of these communication channels, or some other suitable communication channel. In some implementations, the operations of the network adapter device 700 may be implemented in a single integrated circuit, or in a group of integrated circuits. Examples of integrated circuits include ASICs and FPGAs.

In some implementations, the processing cores 702 may include one or more processors configured to execute instructions. Examples of processors that may be included in the processing cores 702 include processors developed by ARM, MIPS, AMD, Intel, Qualcomm, and the like. In some implementations, the processors of the processing cores 702 may share certain resources, such as for example busses, level 1 (L1) caches, and/or level 2 (L2) caches. The instructions executed by the processing cores 702 may be stored on a computer-readable storage medium, for example, in the form of a computer program. The computer-readable storage medium may be non-transitory. In some cases, the computer readable medium may be part of the memory 710. In some implementations, operations of the processing cores 702 (sometimes but not always include some or all of instructions executed by the processing cores 702) may be implemented in one or more integrated circuits. Examples of integrated circuits include ASICs and FPGAs.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the network adapter device 700, while in other cases some or all of the memory may be external to the network adapter device 700.

In some implementations, the configuration module 704 may include one or more configuration registers. Configuration registers may control the operations of the network adapter device 700. In some implementations, one or more bits in the configuration register can represent certain capabilities of the network adapter device 700. Configuration registers may be programmed by instructions executing in the processing cores 702, and/or by an external entity, such as a host device, an operating system executing on a host device, and/or a remote server. The configuration module 704 may further include hardware and/or software that control the operations of the network adapter device 700.

In some implementations, the management module 706 may be configured to manage different components of the network adapter device 700. In some cases, the management module 706 may configure one or more bits in one or more configuration registers at power up, to enable or disable certain capabilities of the network adapter device 700.

The bus interface module 708 may enable communication with external entities, such as a host device and/or other components in a computing system, over an external communication medium. The bus interface 708 module may include a physical interface for connecting to a cable, socket, port, or other connection to the external communication medium. The bus interface module 708 may further include hardware and/or software to manage incoming and outgoing transactions. The bus interface 708 module may implement a local bus protocol, such as NVMe, AHCI, SCSI, SAS, SATA, PATA, and the like. The bus interface 708 module may include at least the physical layer for any of these bus protocols, including a connector, power management, error handling, etc. In some implementations, the network adapter device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network adapter device 700 may include multiple network interface modules, each configured to communicate with a different network. For example, in these implementations, the network adapter device 700 may include a network interface module for communicating with a wired Ethernet network, a wireless 802.11 network, a cellular network, an Infiniband network, etc.

In some implementations, the network adapter device 700 is a PCI-type device. In these implementations, the network adapter device 700 includes a PCI interface for communicating with a host device. The term "PCI" may be used to describe any protocol in the PCI family of bus protocols, including the original PCI standard, PCI-X, AGP, and PCIe. The PCI protocols are standard bus protocols for connecting local peripheral devices to host devices. A standardized bus protocol is a data transfer protocol for which a specification has been defined and adopted by various manufacturers. Manufacturers ensure that compliant devices are compatible with computing systems implementing the bus protocol, and vice versa.

A PCI device may include one or more functions. A "function" describes operations that may be provided by the network adapter device 700. Examples of functions include mass storage controllers, network controllers, display controllers, memory controllers, serial bus controllers, wireless controllers, and encryption and decryption controllers, among others. In some cases, a PCI device may include more than one function. For example, a PCI device may provide a mass storage controller and a network adapter. As another example, a PCI device may provide two storage controllers, to control two different storage resources. In some implementations, a PCI device may have up to eight functions.

In some implementations, the network adapter device 700 may include single-root I/O virtualization (SR-IOV). SR-IOV is an extended capability that may be included in a PCI device. SR-IOV allows a physical resource (e.g., a single network interface controller) to appear as multiple resources (e.g., sixty-four network interface controllers). Thus, a PCI device providing a certain functionality (e.g., a network interface controller) may appear to a device making use of the PCI device to be multiple devices providing the same functionality. The functions of a SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that lack configuration resources, and are generally controlled by the configuration of their underlying physical functions. Each of the physical functions and/or virtual functions may be assigned to a respective thread of execution (such as for example, a virtual machine) running on a host device.

Figure 8:
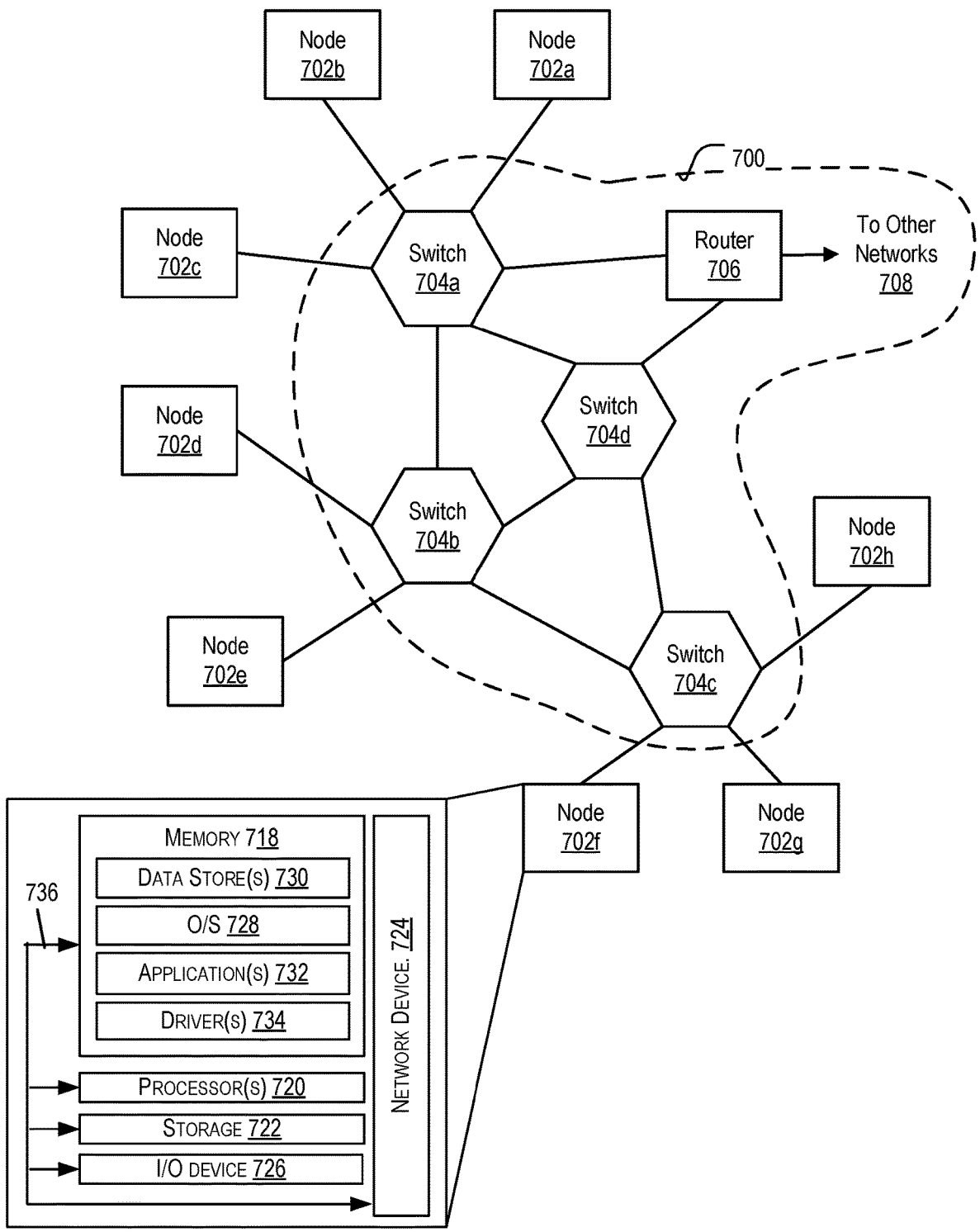
FIG. 8 illustrates an environment in which various aspects of the present disclosure can be implemented.

FIG. 8 illustrates an example network 800, which can include one or more host systems, such as the host system illustrated in FIG. 1. For example, the example network 800 of FIG. 8 includes multiple nodes 802a-802h, one or more of which can be a host system such as is illustrated in FIG. 1. Others of the nodes 802a-802h can be other computing devices, each of which include at least a memory for storing program instructions, a processor for executing the instructions, and a network interface for connecting to the network 800.

In various examples, the network 800 can be used to process data. For example, input data can be received at one of the nodes 802a-802h or from other networks 808 with which the network 800 can communicate. In this example, the input data can be directed to a node in the network 800 that includes an acceleration engine, for the acceleration engine to operate on and produce a result. The result can then be transferred to the node or other network from which the input data was received. In various examples, input data can be accumulated from various sources, including one or more of the nodes 802a-802h and/or computing devices located in the other networks 808, and the accumulated input data can be directed to one or more host systems in the network 800. Results from the host systems can then be distributed back to the sources from which the input data was gathered.

In various examples, one or more of the nodes 802a-802h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 8, the nodes 802a-802h are connected to one another using a switched architecture with point-to point links. The switched architecture includes multiple switches 804a-804d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 804a-804d of FIG. 8 may be connected to the nodes 802a-802h and provide multiple paths between any two nodes.

The network 800 may also include one or more network devices for connection with other networks 808, such as a router 806. Routers use headers and forwarding tables to determine the best path for forwarding the packets, and use protocols such as internet control message protocol (ICMP) to communicate with each other and configure the best route between any two devices. The router 806 of FIG. 8 can be used to connect to other networks 808 such as subnets, LANs, wide area networks (WANs), and/or the Internet.

In some examples, network 800 may include any one or a combination of many different types of networks, such as cable networks, the Internet, wireless networks, cellular networks and other private and/or public networks. The interconnected switches 804a-804d and the router 806, if present, may be referred to as a switch fabric 810, a fabric, a network fabric, or simply a network. In the context of a computer network, terms "fabric" and "network" may be used interchangeably herein.

The nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802*a*-802*h*, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802*a*-802*h* basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802*a*-802*h* or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802*a*-802*h* may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802*a*-802*h*. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802*a*-802*h* may also include I/O device(s) 826, such as a keyboard, a mouse, a pen, a voice input device, a touch input device, a display, speakers, a printer, and the like. The node(s) 802*a*-802*h* may also include one or more communication channels 836. A communication channel 836 may provide a medium over which the various components of the node(s) 802*a*-802*h* can communicate. The communication channel or channels 836 may take the form of a bus, a ring, a switching fabric, or a network.

The node(s) 802*a*-802*h* may also contain network device (s) 824 that allow the node(s) 802*a*-802*h* to communicate with a stored database, another computing device or server, user terminals and/or other devices on the network(s) 800.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method performed by a network adapter device for hardware validation of packets prior to storing the packets in a host computing device, the method comprising:
receiving, by packet validation circuitry of the network adapter device, a packet associated with a packet serial number (PSN);
determining, by the packet validation circuitry, a flowlet identifier associated with the packet;
determining, by the packet validation circuitry, that the packet is targeted for direct data placement into the host computing device, the direct data placement bypassing a management module of the network adapter device;
retrieving, by the packet validation circuitry, flowlet status information for a predetermined number of sequential packets being expected for the flowlet identifier, wherein the flowlet status information includes a PSN base and a transport status for each of the sequential packets to indicate whether that packet has already been received, and wherein the PSN base corresponds to a first packet being expected in the sequential packets;
validating, by the packet validation circuitry, the packet by:
determining that the PSN of the packet corresponds to one of the sequential packets being expected; and
determining that the transport status associated with the PSN of the packet indicates the packet is being received for a first time;
in response to validating the packet:
updating the flowlet status information by modifying the transport status of the packet to indicate that the packet has been received; and
performing direct data placement of the packet into the host computing device, the packet being placed into the host computing device using direct data placement being an out-of-order packet;
determining, by the packet validation circuitry, that a number of packets having consecutive PSNs starting with the PSN base have been received; and
incrementing, by packet validation circuitry, the PSN base by the number of packets.

2. The method of claim 1, wherein updating the flowlet status information further includes increasing the PSN base by a number of consecutive packets starting with the first packet of the sequential packets that have been received and validated.

3. The method of claim 1, further comprising:
receiving a second packet;
determining that a PSN of the second packet does not correspond to any of the sequential packets being expected; and
discarding the second packet to prevent the second packet from being written into the host computing device.

4. The method of claim 1, further comprising:
receiving a second packet;
determining that the second packet is a duplicate packet as indicated by a transport status associated with the PSN of the second packet; and
discarding the second packet to prevent the second packet from being written into the host computing device.

5. A method comprising:
storing, by a receiving device, a data structure representing status information associated with a sliding window of a predetermined number of sequential packets;
receiving, by the receiving device, a packet targeted for a host computing device;
determining, by the receiving device, that the packet is targeted for direct data placement into the host computing device, the direct data placement bypassing a management module of the receiving device;
performing, by the receiving device, a packet validation process on the packet in response to determining that the packet is targeted for direct data placement, wherein the packet validation process includes:
validating, based on a packet serial number (PSN) of the packet, that the packet belongs to the sliding window of the sequential packets; and
validating, based on the PSN of the packet, that the packet is a new packet being received by the receiving device;
updating, by the receiving device, the status information to indicate that the packet associated with the PSN has been received;
placing, by the receiving device, the packet in the host computing device using direct data placement, the packet being placed into the host computing device using direct data placement being an out-of-order packet;
determining, by the receiving device, that a number of consecutive packets starting at a beginning of the sliding window that have been received; and
advancing, by the receiving device, the sliding window by the number of consecutive packets that have been received.

6. The method of claim 5, further comprising:
advancing, by the receiving device, the sliding window by a number of consecutive packets starting at a beginning of the sliding window that have been received.

7. The method of claim 6, wherein the data structure stores a PSN base corresponding to a PSN of a first packet being expected at the beginning of the sliding window.

8. The method of claim 7, wherein advancing the sliding window includes updating the PSN base to a PSN of a next packet of the sequential packets that has not yet been received.

9. The method of claim 5, wherein the data structure stores a data bit representing a transport status of each of the sequential packets of the sliding window.

10. The method of claim 5, further comprising:
verifying a checksum of the packet or performing a static header validation process prior to performing the packet validation process.

11. The method of claim 5, wherein the PSN of the packet is extracted from a header of the packet.

12. The method of claim 5, wherein the sequential packets of the sliding window are associated a flowlet being used to transmit packets from a sender device to the receiving device.

13. The method for claim 12, further comprising:
receiving a second packet associated with the flowlet and having a PSN that corresponds to a packet that is outside the sliding window, or corresponds to a packet that has already been received for the flowlet; and
discarding the second packet to prevent the second packet from being placed in the host computing device.

14. An integrated circuit device comprising:
storage circuitry configured to store status information of a flowlet, the status information representing a sliding window of a predetermined number of sequential packets associated with the flowlet;
validation circuitry configured to perform a packet serial number (PSN) validation process to validate a packet targeted for direct data placement being received by the integrated circuit device, the validation circuitry allowing the direct data placement to be performed on out-of-order packets, wherein the direct data placement bypasses a management module of the integrated circuit device, and wherein the PSN validation process includes:
  validating that a PSN of the packet being received by the integrated circuit device corresponds to one of the sequential packets of the sliding window; and
  validating that a transport status associated with the PSN indicates that the packet is being received for a first time; and
status information update circuitry configured to:
  update the transport status associated with the PSN to indicate that the packet has been received;
  determine that a number of consecutive packets starting at a beginning of the sliding window have been validated; and
  advance the sliding window by the number of consecutive packets starting from the beginning of the sliding window that have been validated by the integrated circuit device.

15. The integrated circuit device of claim 14, further comprising a data placement circuitry configured to place the packet into a host computing device after the PSN validation process.

16. The integrated circuit device of claim 14, wherein the integrated circuit device is configured to perform the PSN validation process after validating other header fields of the packet.

17. The integrated circuit device of claim 16, wherein the status information includes a PSN base representing a first packet at the beginning of the sliding window.

18. The integrated circuit device of claim 16, wherein the status information includes a transport status bit for each of the sequential packets in the sliding window, the transport status bit indicating whether the corresponding packet of the sliding window has previously been received by the integrated circuit device.

19. The integrated circuit device of claim 16, wherein the storage circuitry is configured to store status information for each of a plurality of flowlets being used to transmit packets to a host computing device.

20. The integrated circuit device of claim 16, wherein the PSN validation process is performed without firmware or software analysis of the packet.

21. The integrated circuit device of claim 14, wherein the direct data placement is configured to place the packet in a memory of a host computing device without copying the packet to an operating system buffer of the host computing device.

* * * * *